(12) United States Patent
Anderson et al.

(10) Patent No.: US 8,135,775 B1
(45) Date of Patent: Mar. 13, 2012

(54) SYSTEMS AND METHODS FOR STAGED DEPLOYMENT OF SOFTWARE

(75) Inventors: Devin D. Anderson, South Jordan, UT (US); Paul B. Hillyard, Lindon, UT (US)

(73) Assignee: Crimson Corporation, Shannon (IE)

( * ) Notice: Subject to any disclaimer, the term of this patent is extended or adjusted under 35 U.S.C. 154(b) by 180 days.

(21) Appl. No.: 12/129,571

(22) Filed: May 29, 2008

Related U.S. Application Data

(60) Provisional application No. 60/969,427, filed on Aug. 31, 2007.

(51) Int. Cl.
*G06F 15/16* (2006.01)

(52) U.S. Cl. ........ 709/203; 709/220; 709/223; 709/248; 707/200; 717/170; 717/173; 717/174

(58) Field of Classification Search .................. 709/203, 709/223, 248, 220; 717/173, 174, 170; 707/200
See application file for complete search history.

(56) References Cited

U.S. PATENT DOCUMENTS

| | | | |
|---|---|---|---|
| 6,453,413 B1 | 9/2002 | Chen et al. | |
| 6,785,706 B1* | 8/2004 | Horman | 709/203 |
| 2002/0100036 A1* | 7/2002 | Moshir et al. | 717/173 |
| 2003/0037326 A1 | 2/2003 | Burkhardt et al. | |
| 2003/0212990 A1* | 11/2003 | Brodkorb et al. | 717/174 |
| 2006/0080656 A1* | 4/2006 | Cain et al. | 717/174 |
| 2007/0100892 A1* | 5/2007 | Kephart et al. | 707/200 |

\* cited by examiner

*Primary Examiner* — Kyung H Shin
(74) *Attorney, Agent, or Firm* — Austin, Rapp & Hardman

(57) ABSTRACT

At least one node in the network is assigned to a first deployment group and at least one other node in the network is assigned to a second deployment group. A set of distribution criteria specifies a triggering event which must occur before a software package is deployed to the second deployment group. The software package is deployed to at least one node within the first deployment group. Distribution of the software package to at least one node within the second deployment group is deferred until after the triggering event has occurred.

19 Claims, 8 Drawing Sheets

SYSTEMS AND METHODS FOR STAGED DEPLOYMENT OF SOFTWARE

RELATED APPLICATIONS

This application claims the benefit of U.S. Provisional Patent Application Ser. No. 60/969,427 entitled "Systems and Methods for Staged Deployment of Software" which was filed Aug. 31, 2007, which is expressly incorporated herein by this reference.

TECHNICAL FIELD

The present invention relates generally to computers and computer-related technology. More specifically, the present invention relates to systems and methods for staged deployment of software.

BACKGROUND

Computer and communication technologies continue to advance at a rapid pace. Indeed, computer and communication technologies are involved in many aspects of a person's day. Computers include everything from hand-held computing devices to large multi-processor computer systems.

Computers are used in almost all aspects of business, industry, and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software are continually being integrated into systems across the world.

Installing new computer hardware and/or software, or fixing problems with existing systems, may cause down-time during which the business or individual operates at a diminished level. Most individuals and businesses try to minimize computer problems so as to avoid down-time. Managing the constant barrage of software upgrades and updates can be time consuming and overwhelming to both computer users and network administrators.

As corporate performance and end-user productivity have become increasingly dependent on computers, computer support personnel are continuously under pressure to accomplish more with existing or reduced staff head counts. They are also under pressure to perform tasks as efficiently as possible.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
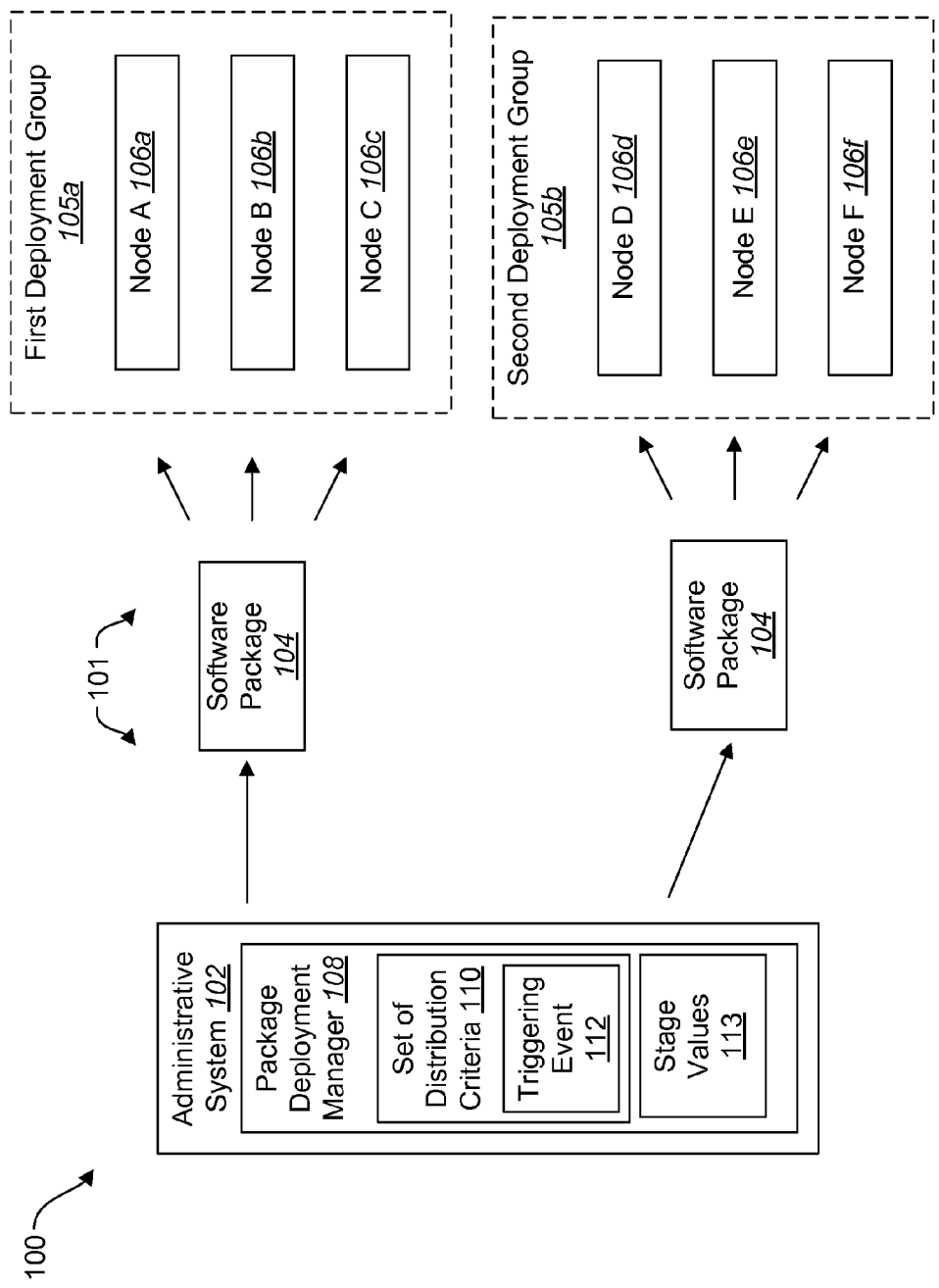
FIG. 1 is a block diagram illustrating one embodiment of a system for staged software deployment.

A computer-implemented method for staged software deployment is disclosed. This method may include assigning at least one node in a network to a first deployment group and assigning at least one other node in the network to a second deployment group. A set of distribution criteria is received. The distribution criteria specifies a triggering event which must occur before a software package is deployed to the second deployment group. The software package is distributed to at least one node within the first deployment group. Distribution of the software package to at least one node within the second deployment group is deferred until after the triggering event has occurred.

The disclosed method may include distributing the software package to at least one node within the second deployment group after the triggering event has occurred. A stage value may be assigned to each of the deployment groups. The stage value controls the order in which software is deployed to each deployment group. Distribution of the software package to any of the nodes within the first deployment group may be deferred until after a different triggering event has occurred.

The triggering event may be embodied in a number of different ways. For example, the triggering event may comprise a response to an electronic message. The triggering event could include the passage of a delay period after the software package has been distributed to each of the nodes within the first deployment group. The delay period could vary depending upon the severity level of the software package. The triggering event could be a minimum percentage or number of successful installations of the software package on nodes within the first deployment group. Also, the triggering event may never occur such that the software package is never deployed to the second deployment group.

A node on the network configured for staged software deployment is also described. The node includes memory and a processor. Instructions in the memory may be executable to implement one or more of the steps or actions described above.

Further, a computer-readable medium comprising executable instructions to deploy software is also disclosed. The instructions may be executable to perform one or more of the actions indicated above. The computer-readable medium may comprise any type of hardware storage device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

FIG. 1 illustrates one embodiment of a system 100 for staged software package 104 deployment. The illustrated system 100 includes an administrative system 102, and two or more deployment groups 105. The administrative system 102 is a computer system or other computing device that may be used to manage other computing systems or devices within a network 101.

The network 101 depicted in FIG. 1 may be embodied in a wide variety of configurations and may include a combination of multiple networks. The network 101 may include, for example, a local area network (LAN), storage area networks (SANs), metropolitan area networks (MANs), wide area networks (WANs), and combinations thereof (e.g., the Internet). A variety of different network wired and wireless configurations and protocols may be used, including, for example, Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), Universal serial bus (USB), fibre channel, etc., that may not typically be viewed as a "network."

In this application, the term "software package" 104 may be any type of computer program or portion of a computer program, including updates or revisions to a computer program, that can be installed or otherwise utilized. A software package 104 may be a set of one or more files that contain logic and binaries for installing a particular piece of software (this kind of package is sometimes referred to as an installation package). An example of a software package is a Microsoft Installer (MSI) file, which may contain files, groups of files, directories, Component Object Model (COM) components, registry keys, shortcuts, and other data. Another example of a software package is a LANDesk® Enhanced Software Distribution (ESWD) package.

In FIG. 1, the depicted network 101 includes a number of nodes 106. While a node 106 may comprise a desktop computer system, this term also encompasses other types of computing devices. For example, it may comprise a desktop computer system, a personal data assistant (PDA) with networking capabilities, a tablet PC, a notebook or laptop computer, a printer, a scanner, a router, a hub, a switch, or a multi-function peripheral (printer/scanner/copier/fax machine).

The nodes 106 are divided into or assigned to two or more deployment groups 105. Assignment of nodes 106 to a particular deployment group may be done automatically, such as by query, or may be performed in response to manual input by an administrator or other user. A deployment group 105 is a set of nodes 106 to which a software package 104 may be deployed. For example, in one network, the following deployment groups 105 could be specified:

1. "My test computers"—computers that represent a diverse set of computers used in the network environment.
2. "My mainstream computers"—computers associated with users that may not recognize when a software package has caused harm versus some other misstep the end user has taken.
3. "Mission critical boxes"—these computers would represent those where the risk of change is the highest. They would only be updated when the software package has been confirmed to not cause issues for the first 2 groups.
4. "Servers"—yet another group that perhaps never receives the software package automatically (because the automatic incrementing to the next deployment group, or stage, may be configured to stop before reaching this stage).

In one embodiment, a node 106 may be assigned only to a single deployment group 105.

The network 101 illustrated in FIG. 1 includes two deployment groups 105. In other embodiments, the number of deployment groups 105 may be increased to include, for example, deployment groups 105 numbered in the tens, hundreds, or even thousands.

Each deployment group 105 includes a number of nodes 106. As shown in FIG. 1, there are three nodes 106 in each deployment group 105. The number of nodes 106 is not a limiting factor of the disclosed system 100. A deployment group 105 could, for example, include a single node 106 or even hundreds or thousands of nodes 106.

Each deployment group 105 may be assigned a deployment order, or a stage value 113. The stage value 113 assigned to the deployment group 105 indicates the order in which a software package 104 will be deployed to that group. A stage value 113 may be any numerical value, letter, or other indicator of order. In one embodiment, multiple deployment groups 105 may be assigned the same stage value 113. Of course, in the embodiment illustrated in FIG. 1, the first deployment group 105a will be the first group to which a software package 104 will be deployed. The software package 104 may be deployed to the second deployment group 105b after a triggering event 112 has occurred, as will be explained below.

As indicated in FIG. 1, the administrative system 102 may include a package deployment manager 108. The package deployment manager 108 manages deployment of software packages 104 to nodes 106 within the network 101 and, more specifically, to nodes 106 within a deployment group 105.

The package deployment manager 108 may utilize a set of distribution criteria 110 which may include one or more triggering events 112. The set of distribution criteria 110 determines and controls the order and manner in which software packages 104 are deployed to the various deployment groups 105 with reference to one or more triggering events 112.

The set of distribution criteria 110 as well as the triggering event 112 may be varied within the scope of the disclosed system 100. For example, the triggering event 112 could be successful installation of the software package 104 on a minimum number or percentage of nodes 106 within the first deployment group 105a. The triggering event 112 could also comprise deployment to a specific number or percentage of nodes 106, without waiting to determine whether the installation is successful or not. Deployment and/or successful installation of the software package 104 to a node 106 may be confirmed by an electronic message (such as an e-mail or instant message) from a node 106 to the administrative system 102. A triggering event 112 could also comprise a series of occurrences, such as receipt of a first software package 104 and a second software package 104 before installation of either package 104 is initiated.

The triggering event 112 may also be the passage of a delay period after deployment or successful installation of the software package 104 on one or more nodes 106. For example, after the software package 104 has been deployed to all nodes 106 within a deployment group 105, the set of distribution criteria 110 could provide for a 7-day waiting period. The waiting period can be important for the successful deployment of a software package 104 and provides a user with an opportunity to test the deployed software package 104 so that the user can determine whether there are any problems with the software package 104. In one embodiment, initiation of the waiting period could be triggered by receipt of electronic message(s) indicating successful installation of the software package 104 on one or more nodes 106 within a particular deployment group 105.

Furthermore, the triggering event 112 may comprise manual approval of an administrator to move forward with deployment or to move forward with deployment to a particular stage. For example, an electronic message could be sent to the administrator after successful installation on nodes 106 within a deployment group 105. By responding to the electronic message or taking other action, distribution of the software package 104 to the next deployment group 105 could be initiated. There could also be a delay period between further deployment and notification of the administrator of successful installation of the software package 104. In such a case, the administrator may determine, based on feedback received from the user, whether to proceed forward with deployment of the software package 104. The delay period could be varied, or preconfigured, based on vulnerability, severity, and/or vendor of the pertinent software package 104.

The set of distribution criteria 110 could also automatically suspend further deployment if successful installation rates are too low or if the administrator sets a specific flag indicating that problems have occurred in the installation or operation of the software package 104.

The set of distribution criteria 110 may also control the timing for distribution of the software package 104. As an example, the set of distribution criteria 110 could specify, for a low priority software package 104, that deployment occurs only on weekends.

The set of distribution criteria 110 could also specify automatic deployment, or specific deployment procedures, based on severity level (e.g., critical or non-critical software), vendor (e.g., ATI® or Microsoft®), or other characteristics of the software package 104. Also, deployment procedures may be specified for certain software packages 104. For example, specific updates to antivirus or anti-spam software may be assigned high priority to enable rapid deployment.

The set of distribution criteria 110 could also specify that after successful deployment to a specific group, a survey, such as an electronic survey, is transmitted to each of the nodes 106 for completion by the user. Further, deployment may depend on the responses to the survey. The responses may be automatically grouped and processed. If a certain percentage are "very dissatisfied" with the operation of a software package 104, for example, deployment could be automatically terminated pending manual approval to move forward.

The set of distribution criteria 110 may be established or altered in various ways. The set of distribution criteria 110 may be established by a user or administrator for the network 101 or by a hardware or software manufacturer. Also, the set of distribution criteria 110 could provide generalized procedures for handling software packages 104 from specific vendors, software of a specific type, or to provide specific procedures related to a specific software package.

Figure 2:
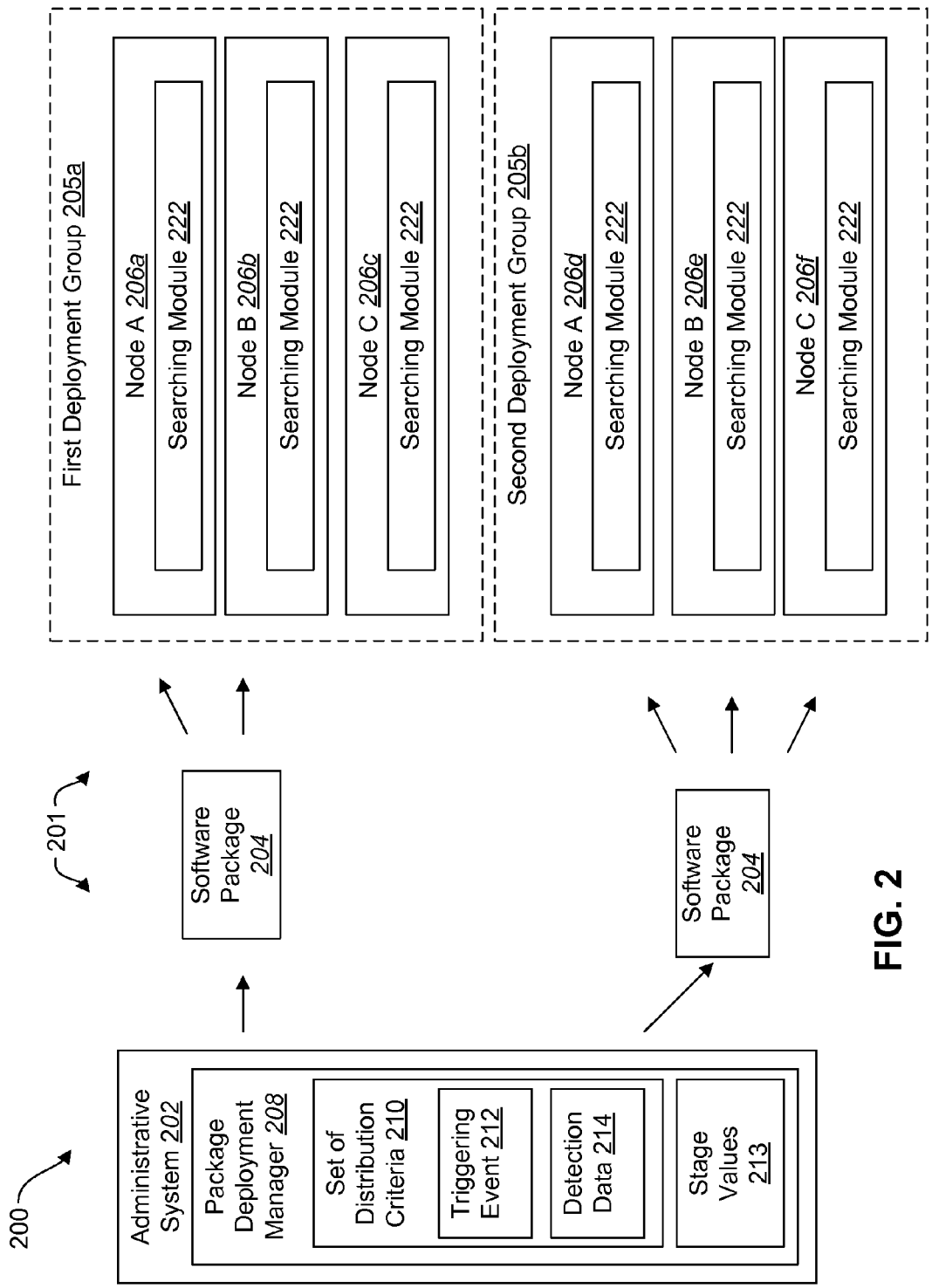
FIG. 2 is a block diagram illustrating another embodiment of a system for staged software deployment.

FIG. 2 is a block diagram illustrating an alternative embodiment of a system 200 for staged deployment of software packages 204. As in the embodiment illustrated in FIG. 1, this embodiment includes an administrative system 202 and one or more deployment groups 205, each group comprising one or more nodes 206 on a network 201. The administrative system 202 similarly includes a package deployment manager 208 having a set of distribution criteria 210 that may include a triggering event 212. Stage values 213 may be assigned to each deployment group 205 to indicate the order in which deployment will occur.

In this embodiment, however, the package deployment manager 208 includes detection data 214. The detection data 214 indicates what software and/or updates have been installed on the nodes 206. The detection data 214 may also indicate software dependencies, i.e., a first software package 204 must be installed before a second software package 204 is installed. The detection data 214 may be stored on the administrative system 202 (as illustrated in FIG. 2) or, alternatively, could be stored on each node 206 or a particular node 206 within the network 201.

In the illustrated embodiment, each node 206 includes a searching module 222. The searching module 222 scans each node 206 to determine the installed software and updates. Of course, a single node 206 or the administrative system 202 could be designated to scan other nodes 206 or a group of nodes 206 within the scope of the disclosed system 200.

The detection data 214 may be utilized by the package deployment manager 208 to determine which software packages 204 to deploy to each deployment group 205 and, in turn, each individual node 206. As illustrated, for example, in FIG. 2, the software package 204 at issue is only deployed to Node A 206a and Node B 206b within the first deployment group 205a. This could, of course, be caused by various reasons. For example, the software program to which the software package 204 is an update may not be installed on Node C 206c. Alternatively, a user could manually update the software program to include the software package 204 being distributed. As can be seen from this illustration, the detection data 214 interacts with the set of distribution criteria 210 to determine where software packages 204 will be deployed and the order in which they will be deployed among the various deployment groups 205. Thus, even if the triggering event 212 has occurred, a software package 204 may not be deployed to a particular node 206 or deployment group 205 where the detection data 214 indicates that deployment is inappropriate. The detection data 214 may further limit nodes 206 to which software may be deployed.

Furthermore, the detection data 214 may further limit nodes 206 to which software is deployed based on user or administrative input. For example, within a company, only engineers may need to use a CAD drawing program. Thus, the detection data 214 could limit distribution of such a program to nodes 206 that are or are likely to be used by individuals within the engineering group.

Figure 3:
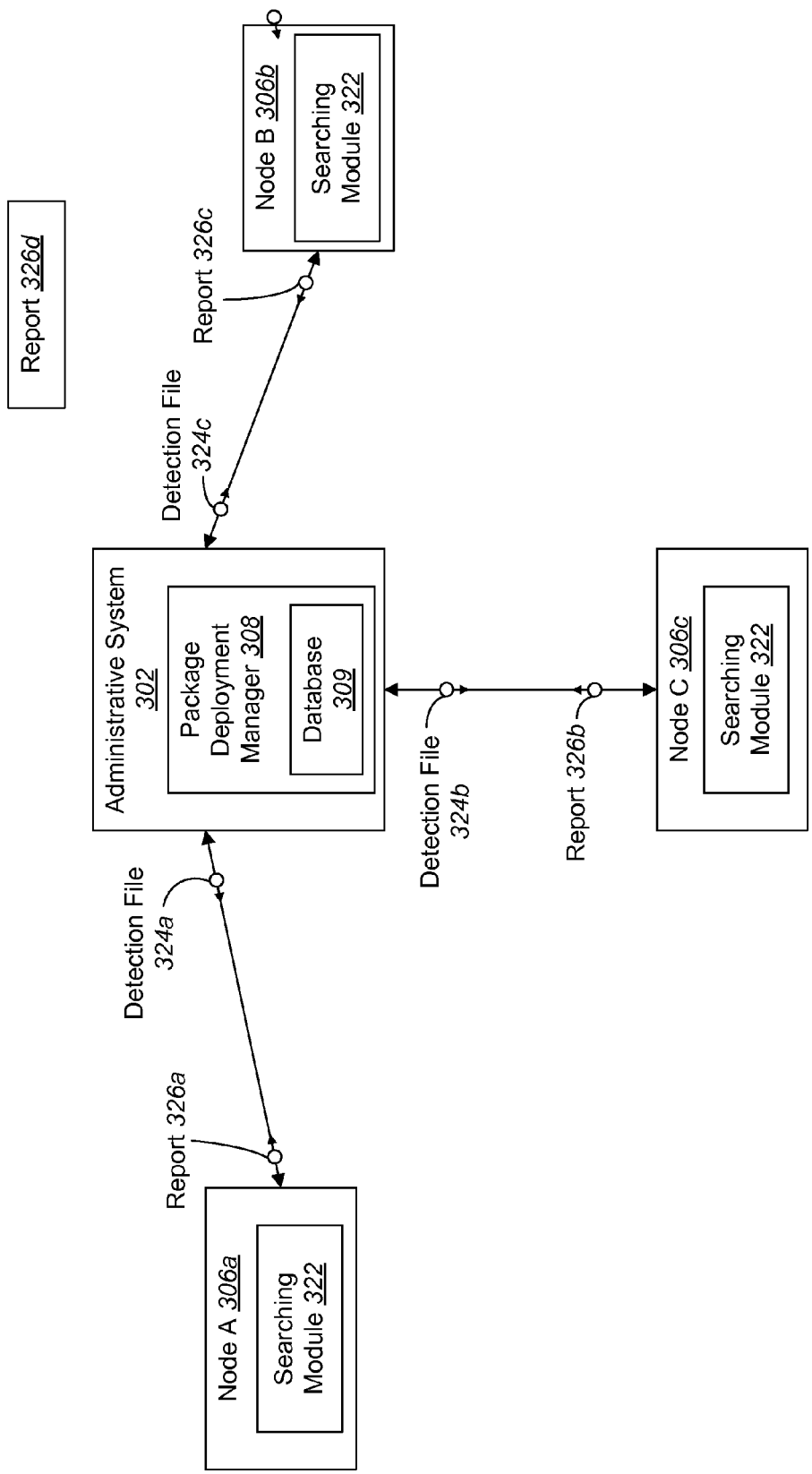
FIG. 3 is a block diagram illustrating one embodiment of a system for determining which files should be installed on a particular node utilizing staged software deployment.

Referring now to FIG. 3, an exemplary manner by which a package deployment manager 308 may determine which software packages 204 (shown in FIG. 2) are already installed on the nodes 306 will now be discussed. In the illustrated embodiment, the package deployment manager 308 sends a detection file 324 to each of the target nodes 306. A searching module 322 utilizes the detection file 324 to identify which software packages 204 could be installed on the node 306 based on currently installed software, the deployment group 205 to which the node 306 belongs, the software that should be installed on the node 306, and other relevant factors.

There are many ways that the searching module 322 on a target node 306 may notify the package deployment manager 308 about its search results. For example, as shown in FIG. 3, a report 326 may be sent from each target node 306 to the package deployment manager 308. The report 326 from a particular target node 306 may, for example, list all of the identified software packages 204 and, for each listed software package 204, indicate whether it is installed or not installed on the corresponding node 306. As an alternative to the illustrated embodiment, the report 326 from a particular searching module 322 may list only the software packages 204 that are installed (or that are not installed) on the corresponding node 306.

There are many different kinds of searching modules 322 and detection files 324 that may be used. An example of a searching module 322 that may be used is a vulnerability scanner, which is a tool that is provided by the LANDesk® Patch Manager. An example of a detection file 324 that may be used is a LANDesk® Patch Manager vulnerability definition file.

An exemplary vulnerability definition file could have commands that trigger a search for certain file(s) or registry key(s) to ensure that they have the proper values or are present. The definition file could also contain a list of remediation steps if the files or registry keys are not found. These steps could include downloading and installing patches.

Once the package deployment manager 308 determines which software packages 204 are already installed on the nodes 306, it may build one or more lists that indicate where the software packages 204 are going to be deployed. A separate target list may be built for each software package 204. The target list for a particular software package 204 may indicate which of the target nodes 306 are going to receive that dependency.

Although sending a detection file 324 to the target nodes is one way to determine what dependencies are installed, embodiments are not limited in this regard. Other mechanisms for determining what dependencies are installed on the target nodes 306 may also be used, such as Visual Basic scripts, executable files, etc.

In one embodiment, the searching module 322 could query the administrative system 302 to determine which software packages 204 should be installed. The administrative system 302 could use various information sources to determine which software packages 204 should be installed including, for example, a report 326 received from the node 306. In addition, the administrative system 302 could look up the lowest stage number of any group that node 306 belongs to in order to determine which software packages 204 should be installed.

In one embodiment, a database 309 that describes the detection file 324 could include, for example, current stage, maximum stage, date/time of last stage change, date/time of next proposed stage change, interval required between stage change (which could be stored as a global setting based on the severity/vendor of the definition as well), whether to notify the administrator and request permission to advance stages (which could also be global), and whether permission has been requested to advance to the next stage (which could be cleared when permission is granted).

The package deployment manager 308 could search for detection files 324 that should be advanced to the next stage. The component could compare the current time with the "next proposed stage change."

In one embodiment, the package deployment manager 308 could query one or more nodes 306 to determine the stage assigned to each node 306. The searching module 322 could report its stage in response to such a query via a report 326 or other means.

Figure 4:
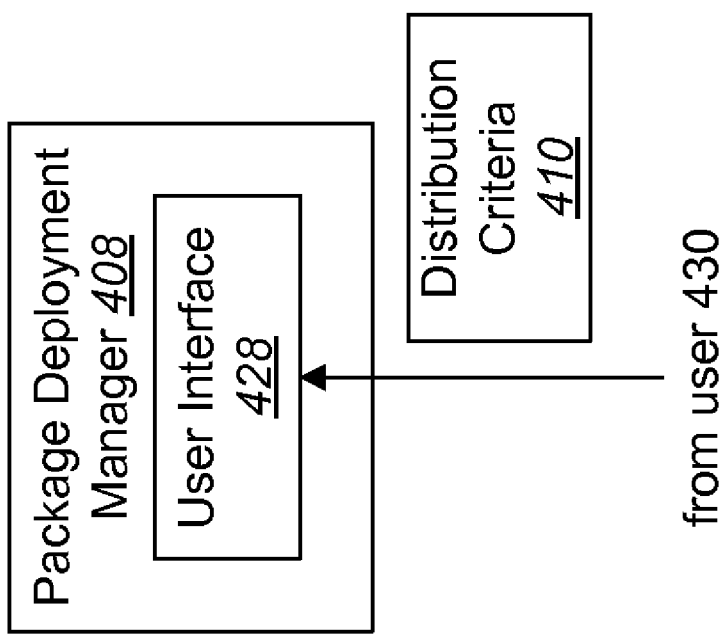
FIG. 4 is a block diagram illustrating one embodiment of a system for inputting distribution criteria for staged software deployment utilizing a user interface.

As illustrated in FIG. 4, the set of distribution criteria 410 may be established by a user 430 via a user interface 428 for the package deployment manager 408. A user 430 typically is an administrator, but could be other individuals. As noted above, the package deployment manager 408 may operate on an administrative system 302 or some other node 306 (shown in FIG. 3). Furthermore, the set of distribution criteria 410 may be modified or set by a user 430 directly at an administrative system 302 or whatever node 306 the package deployment manager 408 is running on. Alternatively, the set of distribution criteria 410 may be modified or set at a remote node 306 to the node 306 on which the package deployment manager 408 is operating.

In another embodiment, the package deployment manager 408 operates on default settings specified by a manufacturer of the package deployment manager 408 or based on defaults specified by a manufacturer of a software package. Files or data containing the settings may be loaded or accessed automatically, or through manual intervention, or manually by the package deployment manager 408.

Figure 5:
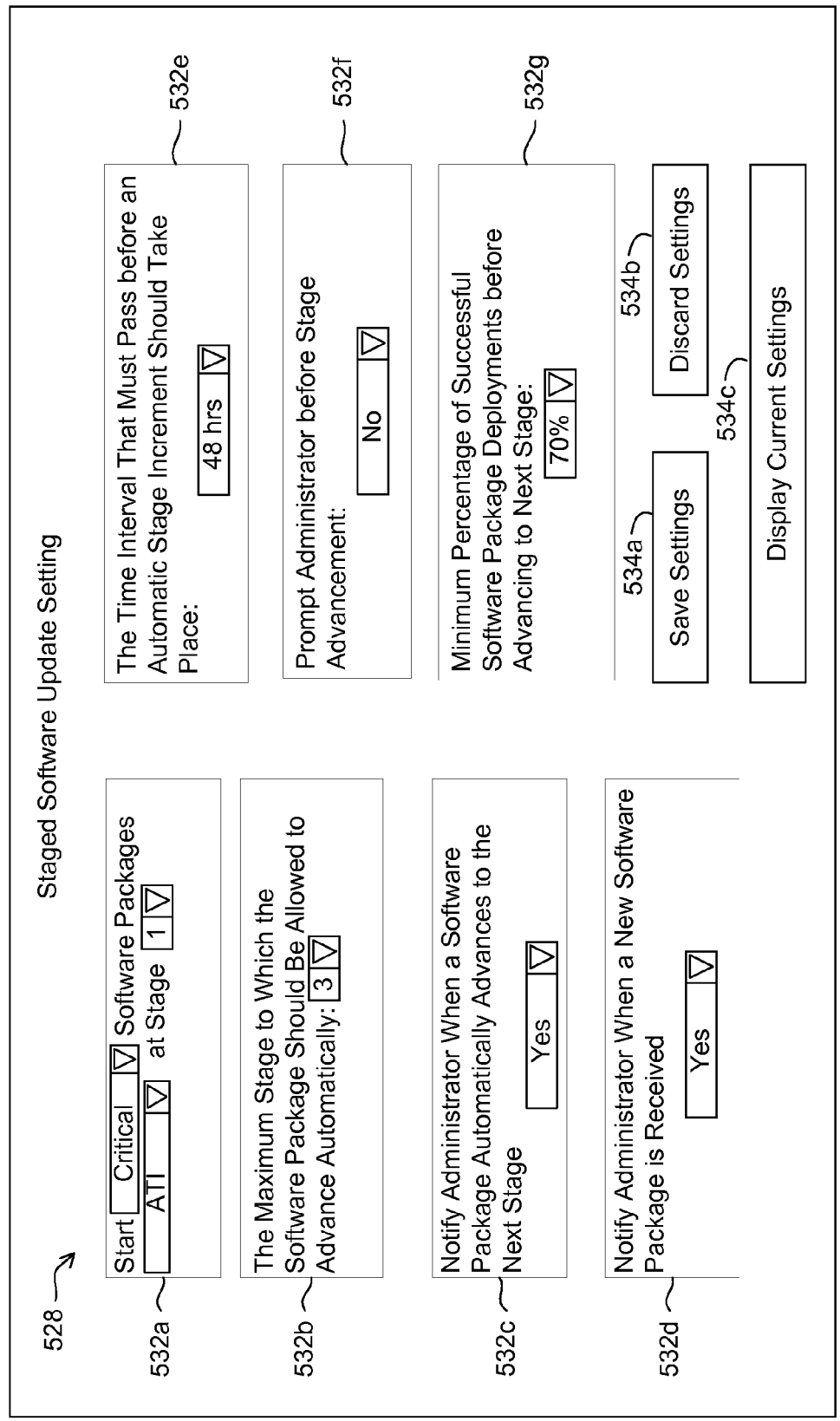
FIG. 5 is a diagram illustrating one embodiment of a user interface for inputting distribution criteria.

FIG. 5 illustrates one embodiment of a user interface 528 for controlling staged software deployments. The illustrated user interface 528 includes several user interface boxes 532. The first user interface box 532a prompts a user 430 (shown in FIG. 4) to specify the stage to which software packages 204 (shown in FIG. 2) will be deployed after they have been received. For example, as illustrated in FIG. 5, a user 430 could specify that critical software packages 204 from ATI® will start at stage 1. As indicated above, each deployment group 205 is designated with a stage number that indicates the order in which the software packages 204 will then be transmitted to that deployment group 205. Thus, using this user interface box 532a, a user 430 may specify how software packages 204 of different severity levels (e.g., critical, non-critical, or of any intermediate severity levels) are handled. The user 430 may also specify how software packages 204 from different manufacturers, such as ATI® or Microsoft®, are handled. Of course, one of the options in the illustrated user interface 528 may be to specify how software packages 204 of all severity levels or from all manufacturers or combinations thereof are deployed.

A second user interface box 532b limits the stage to which a software package 204 will be deployed automatically. For example, a software package 204 could be deployed to the third stage and thereafter could be caused, awaiting administrator approval, to move to a next stage. Alternatively, progression to the third stage may stop altogether unless an administrator takes action to deploy the software package 204 to a higher stage.

A third user interface box 532c indicates whether an administrator wants to be notified when deployment of a software package 204 to a stage has been completed and deployment to the next stage commences.

Using the fourth user interface box 532d, a user 430 may specify whether an administrator is notified when new software packages 204 are received. In one embodiment, a user 430 may specify whether notification is provided for specific software packages 204, software packages 204 of a particular severity level, or software packages 204 from a particular manufacturer, etc., using options shown on the drop down menu.

In the fifth user interface box 532e, the user 430 may specify a time interval before deployment moves on to the next stage after successful deployment to a prior deployment group 205. This time interval could be specified in minutes, hours, days, weeks, months, etc. As explained above, the delay between deployment among stages enables an administrator to receive feedback indicating whether there are problems with the software package 204 being deployed.

The sixth user interface box 532f provides a user 430 with the opportunity to specify that the administrator be prompted before the software or software packages 204 are deployed to a new deployment group. In one embodiment, an administrator needs to respond to an electronic message that asks whether deployment should proceed before further action is taken.

The seventh user interface box 532g allows a user 430 to specify a minimum percentage of successful deployments before deployment to the next stage begins. In one embodiment, the default value is 100% successful deployment before deployment to the new stage can begin. In this case, only if the software packages have been deployed successfully to 100% of the nodes 306 within the specified deployment group 205 will deployment proceed to the next stage.

In each of these user interface boxes 532, the drop down menus may present a user 430 with wide variety of options, not necessarily a "Yes," "No," or a numerical value. For example, with respect to the third user interface box 532c, a user 430 could specify that notice be provided when critical software packages 204 advance to the next stage or when non-critical software packages 204 advance to the next stage. Thus, the user interface 528 can provide a great deal of flexibility and customization for staged deployment of software packages 204.

The illustrated user interface 528 also includes three user interface buttons 534. A first user face button 534a enables a user 430 to save the settings currently shown on the screen. A second user interface button 534b allows a user 430 to discard the currently displayed settings. A third user interface button 534c allows a user 430 to display each of the current settings.

A user 430, in one embodiment, may have different settings for software packages 204 from different manufacturers or software packages 204 of a different severity level. Activating the display current settings button 534c, in one embodiment, triggers a display of all settings that have been saved.

Using the user interface 528, the set of distribution criteria 510 could provide for different procedures depending on various factors, such as the severity level of the software package 204. For example, "critical" software packages 204 could be installed more quickly with smaller delays between stages. Also, the set of distribution criteria 210 could provide for different triggering event(s) 212 when entering different stages. For example, the triggering event(s) 212 could be different when moving from stage 2 to stage 3 than the triggering event(s) 212 controlling the transition from stage 3 to stage 4.

Figure 6:
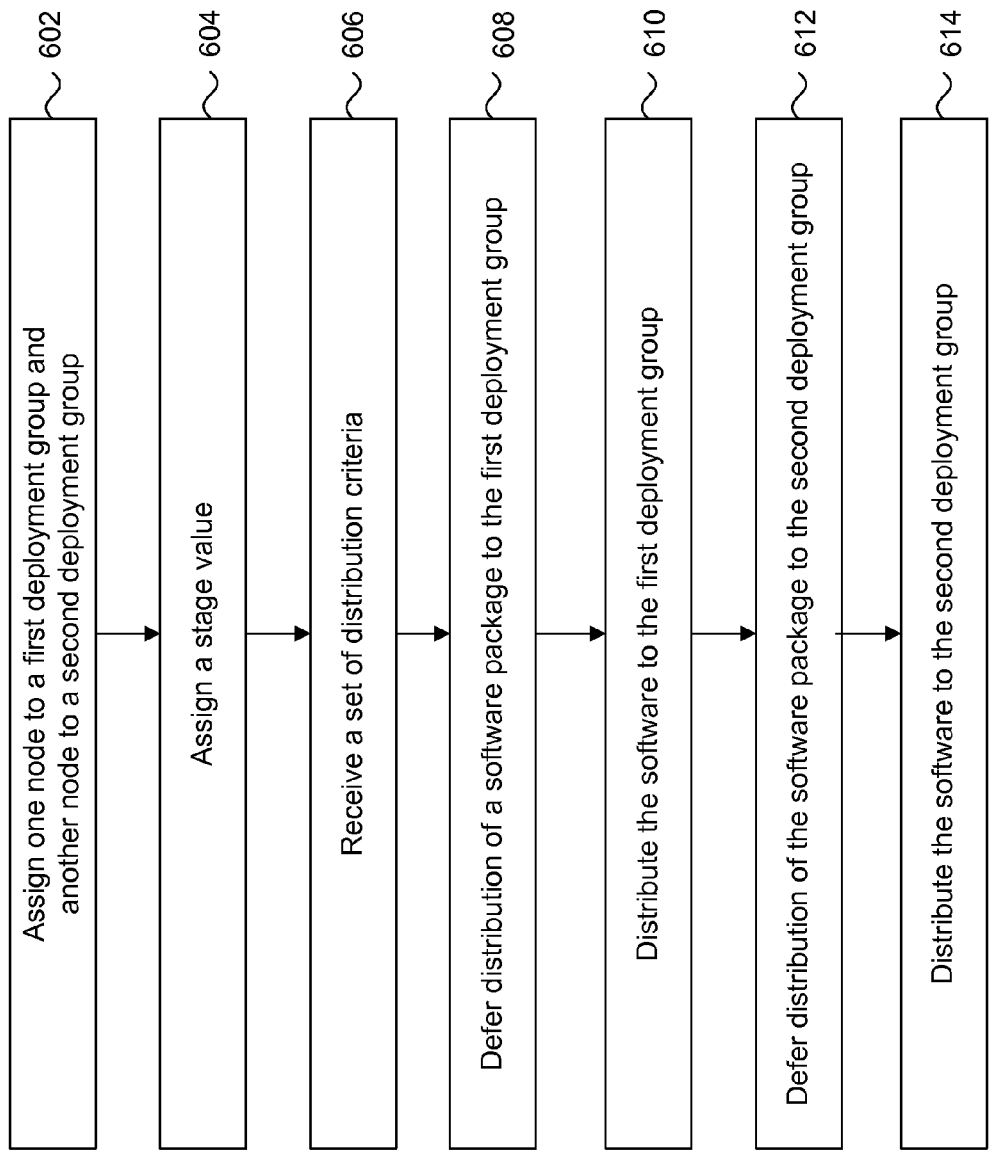
FIG. 6 is a flow diagram illustrating one embodiment of a method for staged software deployment.

FIG. 6 illustrates one embodiment of a method for staged software deployment. At least one node 206a is assigned 602 to a first deployment group 205a and another node 206d is assigned to a second deployment group 205b. Of course, the disclosed method may include many deployment groups 205, and is not limited to two deployment groups 205. As indicated above, each deployment group 205 may include numerous nodes 206, not merely a single node 206.

In one embodiment, each deployment group 205 is assigned 604 a stage value 213. As explained above, the stage value 213 indicates the order in which a software package 204 is distributed to the deployment groups 205. In one embodiment, for example, a deployment group 205 assigned the stage value "1" will be the first deployment group 205 to which the software package 204 is deployed. In another embodiment, a single node 206 may be assigned to multiple deployment groups 205. Also, multiple deployment groups 205 may have the same stage value 213, creating, in essence, a new, conjoined deployment group 205.

A set of distribution criteria 210 may be received 606 at, for example, an administrative node 302. The distribution criteria 210 includes at least one triggering event 212 for deployment of the software to at least one of the deployment groups 205. The distribution criteria 210 may be embodied in many different ways as explained more particularly in connection with the prior figures. By way of example only, a software package 204 could be deployed to a first deployment group 205a only after administrative approval to proceed forward. The administrative approval may come in the form of a response to an electronic message notifying the administrator that a software package 204 has been received for deployment to a first deployment group 205a.

In one embodiment, deployment to the first deployment group 205a is deferred 608 until a triggering event 212 has taken place. Of course, this step is optional and software could automatically be deployed to a first deployment group 205a without the occurrence of a triggering event 212. Following the optional step of deferral of deployment, one or more software packages 204 are deployed 610 to the first deployment group 205a.

Deployment to the second deployment group 205b may then be deferred 612. As indicated above, various triggering events 212 may control the deployment. Once again, the triggering event 212 may be embodied in a number of ways, including those discussed in other portions of this application. In one embodiment, distribution to a particular deployment group 205 is conditioned upon the occurrence of multiple triggering events 212, such as administrative approval from two different administrators.

After the triggering event 212 has occurred, a software package(s) 204 may then be deployed 614 to the second deployment group 205b. Deferring deployment to the second deployment group 205b provides a testing period for the software. During this testing period, an administrator may receive positive or negative feedback regarding the software package 204. If negative feedback is received, the administrator may terminate or delay further deployment of the software package 204.

It should be noted that the method shown in FIG. 6 is merely illustrative. The disclosed method may be embodied in a number of different ways. For example, a node 206 may be assigned to a deployment group 205 in response to an administrator request. Alternatively, nodes 206 could be assigned to deployment groups 205 in an automated or semi-automated fashion based on a query. Similarly, stage values 213 may be assigned in response to user input, or through the use of queries or other automated or semi-automated techniques.

Figure 7:
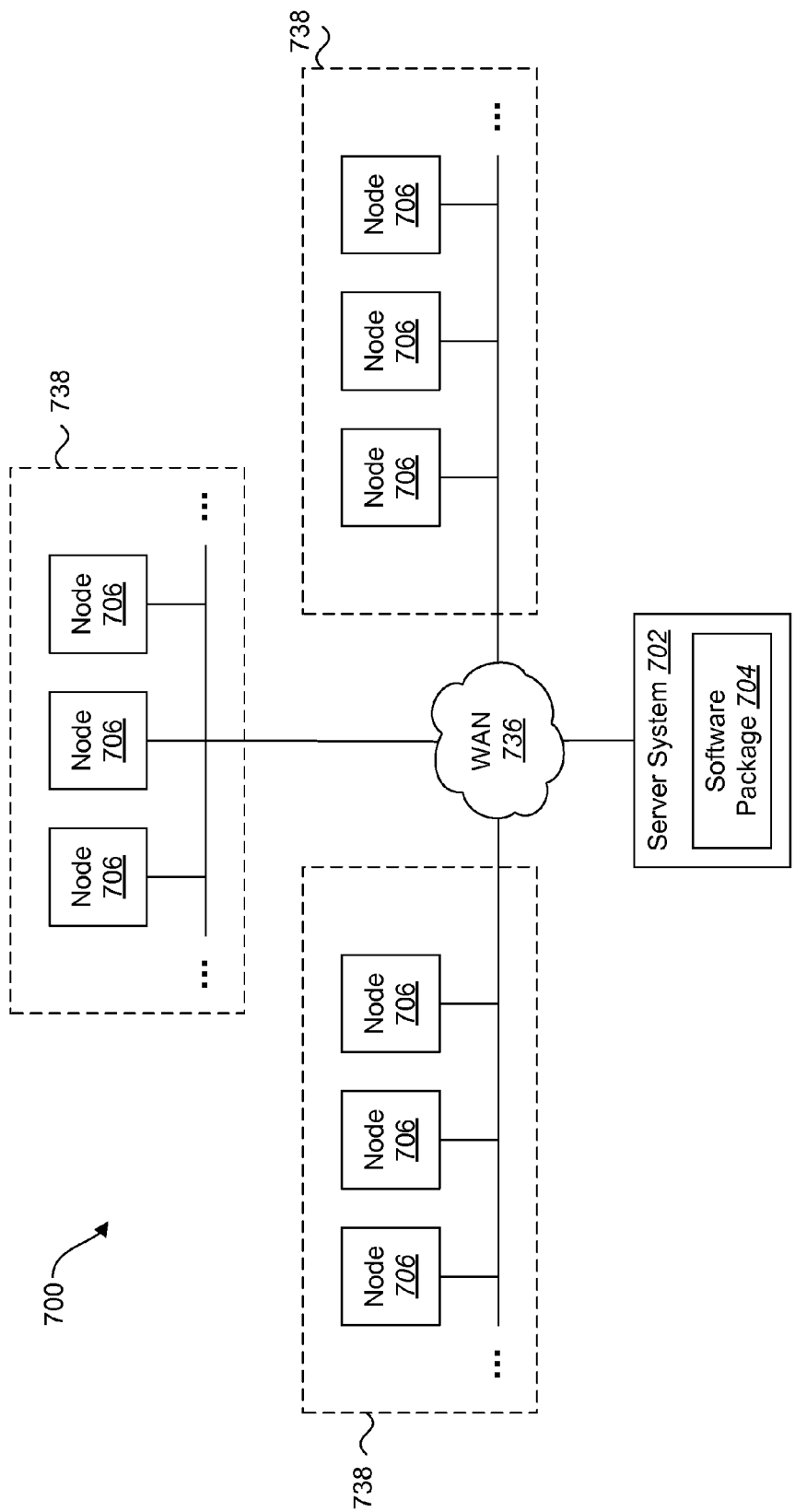
FIG. 7 is a block diagram illustrating an exemplary computer network in which embodiments of the disclosed systems and methods may be practiced, the computer network including a wide area network (WAN) link.

FIG. 7 illustrates an exemplary computer network 700 in which embodiments may be practiced. The network 700 includes a WAN 736 link and multiple local area networks 738 (LANs). Each LAN 738 may include a plurality of target nodes 706. The WAN 736 link connects the various LANs 738 together. A server system 702 (e.g., the administrative system) where the software package 704 and its dependencies are stored is connected to the LANs 738 by means of the WAN 736 link.

Figure 8:
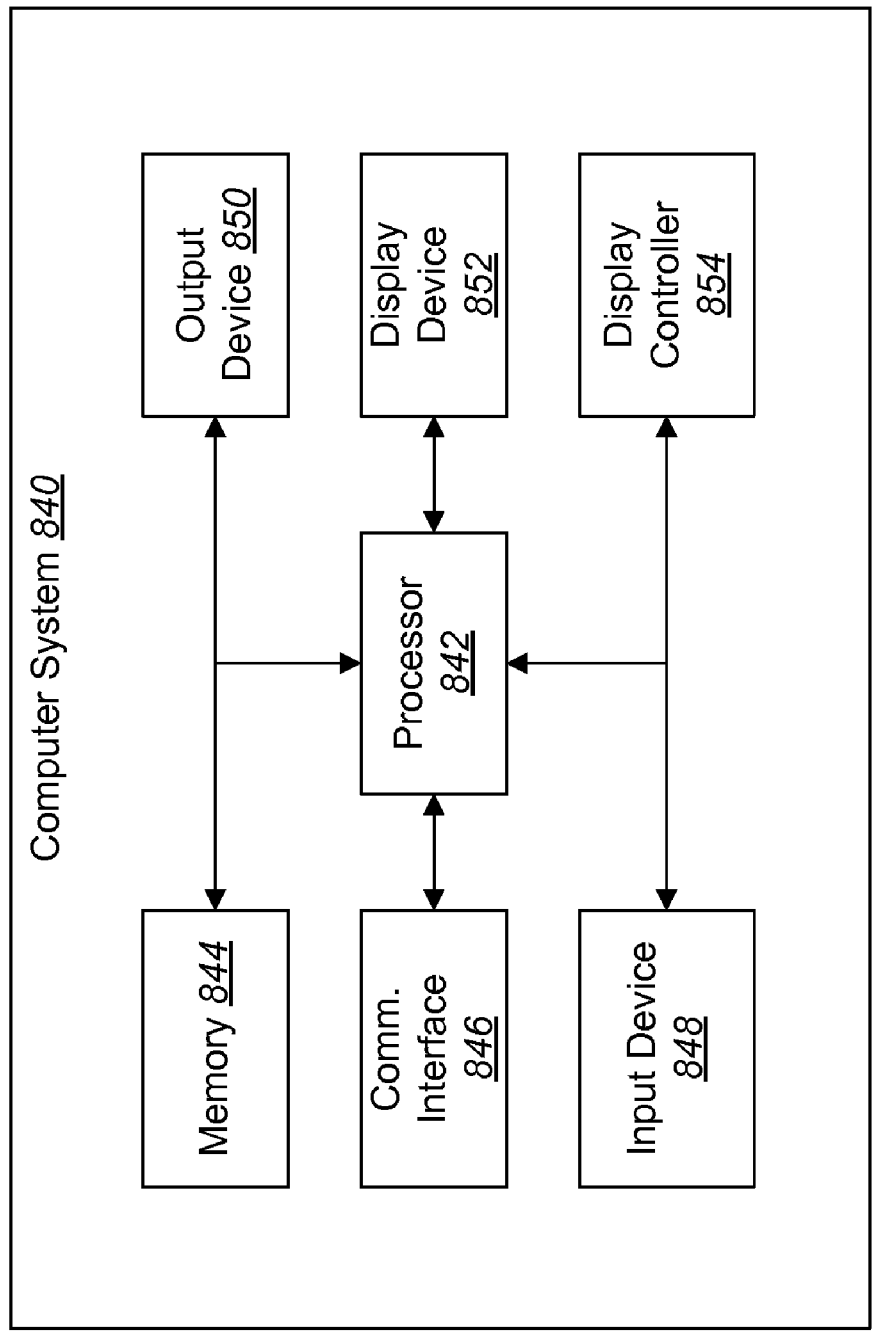
FIG. 8 is a block diagram illustrating the major hardware components typically utilized in a computer system.

FIG. 8 is a block diagram illustrating the major hardware components typically utilized in a computer system 840. The illustrated components may be located within the same physical structure or in separate housings or structures.

The computer system 840 includes a processor 842 and memory 844. The processor 842 controls the operation of the computer system 840 and may be embodied as a microprocessor, a microcontroller, a digital signal processor (DSP) or other device known in the art. The processor 842 typically performs logical and arithmetic operations based on program instructions stored within the memory 844.

As used herein, the term memory 844 is broadly defined as any electronic component capable of storing electronic information, and may be embodied as read only memory (ROM), random access memory (RAM), magnetic disk storage media, optical storage media, flash memory devices in RAM, on-board memory included with the processor 842, EPROM memory, EEPROM memory, registers, etc. The memory 844 typically stores program instructions and other types of data. The program instructions may be executed by the processor 842 to implement some or all of the methods disclosed herein.

The computer system 840 typically also includes one or more communication interfaces 846 for communicating with other electronic devices. The communication interfaces 846 may be based on wired communication technology, wireless communication technology, or both. Examples of different types of communication interfaces 846 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter, and so forth.

The computer system 840 typically also includes one or more input devices 848 and one or more output devices 850. Examples of different kinds of input devices 848 include a keyboard, mouse, microphone, remote control device, button, joystick, trackball, touchpad, lightpen, etc. Examples of different kinds of output devices 850 include a speaker, printer, etc. One specific type of output device which is typically included in a computer system 840 is a display device 852. Display devices 852 used with embodiments disclosed herein may utilize any suitable image projection technology, such as a cathode ray tube (CRT), liquid crystal display (LCD), light-emitting diode (LED), gas plasma, electroluminescence, or the like. A display controller 854 may also be provided, for converting data stored in the memory 844 into text, graphics, and/or moving images (as appropriate) shown on the display device 852.

Of course, FIG. 8 illustrates only one possible configuration of a computer system 840. Various other architectures and components may be utilized.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium or non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computer-implemented method for staged software deployment comprising:
    assigning at least one node in a network to a first deployment group and at least one other node in the network to a second deployment group;
    assigning a stage value to each of the deployment groups, wherein the stage value controls the order in which software is deployed to each deployment group;
    receiving a set of distribution criteria that specifies a triggering event which must occur before a software package is deployed to the second deployment group, wherein the distribution criteria is configurable to specify different triggering events based upon the severity level of the software package;
    distributing the software package to at least one node within the first deployment group; and
    deferring distribution of the software package to at least one node within the second deployment group until after the triggering event has occurred.

2. The method of claim 1, further comprising distributing the software package to at least one node within the second deployment group after the triggering event has occurred.

3. The method of claim 1, wherein distribution of the software package to any of the nodes within the first deployment group is deferred until after a different triggering event has occurred.

4. The method of claim 1, wherein the triggering event comprises passage of a delay period after the software package has been distributed to each of the nodes within the first deployment group.

5. The method of claim 4, wherein the delay period varies depending upon the severity level of the software package.

6. The method of claim 1, wherein at least two nodes in the network are assigned to the first deployment group, and wherein the triggering event is a minimum percentage of successful installations of the software package on the nodes within the first deployment group.

7. The method of claim 1, wherein at least two nodes in the network are assigned to the first deployment group, and wherein the triggering event is a minimum number of successful installations of the software package on the nodes within the first deployment group.

8. The method of claim 1, wherein the triggering event never occurs such that the software package is never deployed to the second deployment group.

9. The method of claim 1, wherein the different triggering events are selected from a defined set of triggering events, and wherein the defined set of triggering events includes at least the following triggering events:
    successful installation of the software package on a minimum number of nodes within the first deployment group;
    successful installation of the software package on a minimum percentage of nodes within the first deployment group;
    deployment of the software package on a minimum number of nodes within the first deployment group without waiting to determine whether installation is successful or not;
    deployment of the software package on a minimum percentage of nodes within the first deployment group without waiting to determine whether installation is successful or not;
    passage of a delay period after the software package has been distributed to each of the nodes within the first deployment group; and
    manual approval of an administrator.

10. A node on a network that is configured for staged software deployment, the node comprising:
    a processor;
    memory in electronic communication with the processor; and
    instructions stored in the memory, the instructions being executable to:
        assign at least one node in a network to a first deployment group and at least one other node in the network to a second deployment group;
        assign a stage value to each of the deployment groups, wherein the stage value controls the order in which software is deployed to each deployment group;
        receive a set of distribution criteria that specifies a triggering event which must occur before a software package is deployed to the second deployment group, wherein the distribution criteria is configurable to specify different triggering events based upon the severity level of the software package;
        distribute the software package to at least one node within the first deployment group; and
        defer distribution of the software package to at least one node within the second deployment group until after the triggering event has occurred.

11. The node of claim 10, wherein the instructions are further executable to distribute the software package to at least one node within the second deployment group after the triggering event has occurred.

12. The node of claim 10, wherein the instructions are further executable to defer deployment of the software package to any of the nodes within the first deployment group until after a different triggering event has occurred.

13. The node of claim 10, wherein the triggering event comprises a response to an electronic message.

14. The node of claim 10, wherein the triggering event comprises passage of a delay period after the software package has been distributed to each of the nodes within the first deployment group.

15. A non-transitory computer-readable medium comprising executable instructions to deploy software, the instructions being executable to:
    assign at least one node in a network to a first deployment group and at least one other node in the network to a second deployment group;
    assign a stage value to each of the deployment groups, wherein the stage value controls the order in which software is deployed to each deployment group;

receive a set of distribution criteria that specifies a triggering event which must occur before a software package is deployed to the second deployment group, wherein the distribution criteria is configurable to specify different triggering events based upon the severity level of the software package;

distribute the software package to at least one node within the first deployment group; and defer distribution of the software package to at least one node within the second deployment group until after the triggering event has occurred.

16. The non-transitory computer-readable medium of claim 15, wherein the instructions are further executable to distribute the software package to at least one node within the second deployment group after the triggering event has occurred.

17. The non-transitory computer-readable medium of claim 15, wherein the instructions are further executable to defer deployment of the software package to any of the nodes within the first deployment group until after a different triggering event has occurred.

18. The non-transitory computer-readable medium of claim 15, wherein the triggering event comprises a response to an electronic message.

19. The non-transitory computer-readable medium of claim 15, wherein the triggering event comprises passage of a delay period after the software package has been distributed to each of the nodes within the first deployment group.

* * * * *